July 31, 1934.   W. S. GUBELMANN   1,968,387
POWER MECHANISM
Original Filed March 24, 1915   7 Sheets-Sheet 3

William S. Gubelmann
By   a.a. Wicke
Attorneys

July 31, 1934.  W. S. GUBELMANN  1,968,387

POWER MECHANISM

Original Filed March 24, 1915  7 Sheets-Sheet 4

William S. Gubelmann

July 31, 1934.  W. S. GUBELMANN  1,968,387
POWER MECHANISM
Original Filed March 24, 1915  7 Sheets-Sheet 5

William S. Gubelmann
By A. A. Klicke
Attorneys

July 31, 1934.   W. S. GUBELMANN   1,968,387
POWER MECHANISM
Original Filed March 24, 1915   7 Sheets-Sheet 6

William S. Gubelmann
By Attorneys

Patented July 31, 1934

1,968,387

UNITED STATES PATENT OFFICE 1,968,387

POWER MECHANISM

William S. Gubelmann, Brooklyn, N. Y.

Original application March 24, 1915, Serial No. 16,636. Divided and this application August 2, 1930, Serial No. 472,653

24 Claims. (Cl. 185—39)

This application is a division of my prior copending application, Serial No. 16,636, filed March 24, 1915. Said application discloses comprehensive improvements in what are commonly known as adding machines and includes that type thereof capable of not only adding or accumulating but also of subtracting, and in which operations may be performed on different sets of accumulators for such purposes as grand totalizing, bookkeeping, etc., and in which printed lists of the operations may be simultaneously produced, and which performs a number of desirable functions not possible in machines heretofore known and which performs the usual functions of this class of machine in a superior manner. The machine is in many respects a modified and improved construction of the machine described in my pending application filed September 19, 1912, Serial No. 721,141, and also of my application filed January 10, 1900, Serial No. 1,004.

The present application relates to power mechanism, including the construction of the power storing motor, the application of power thereto by the operating key or the operating crank, connections from the operating key and crank, the release of the main operating shaft, connections for driving the operating shaft, and connections for restoring excess power from the operating shaft to the motor.

The present description and drawings are limited to the above indicated mechanisms and such parts as necessarily cooperate therewith, the complete machine being fully illustrated and described in the parent application.

The driving mechanism

The driving mechanism is constructed to be operated manually, although if it is desired it may be operated by power.

Figures 14, 15, 16, 17, 18:
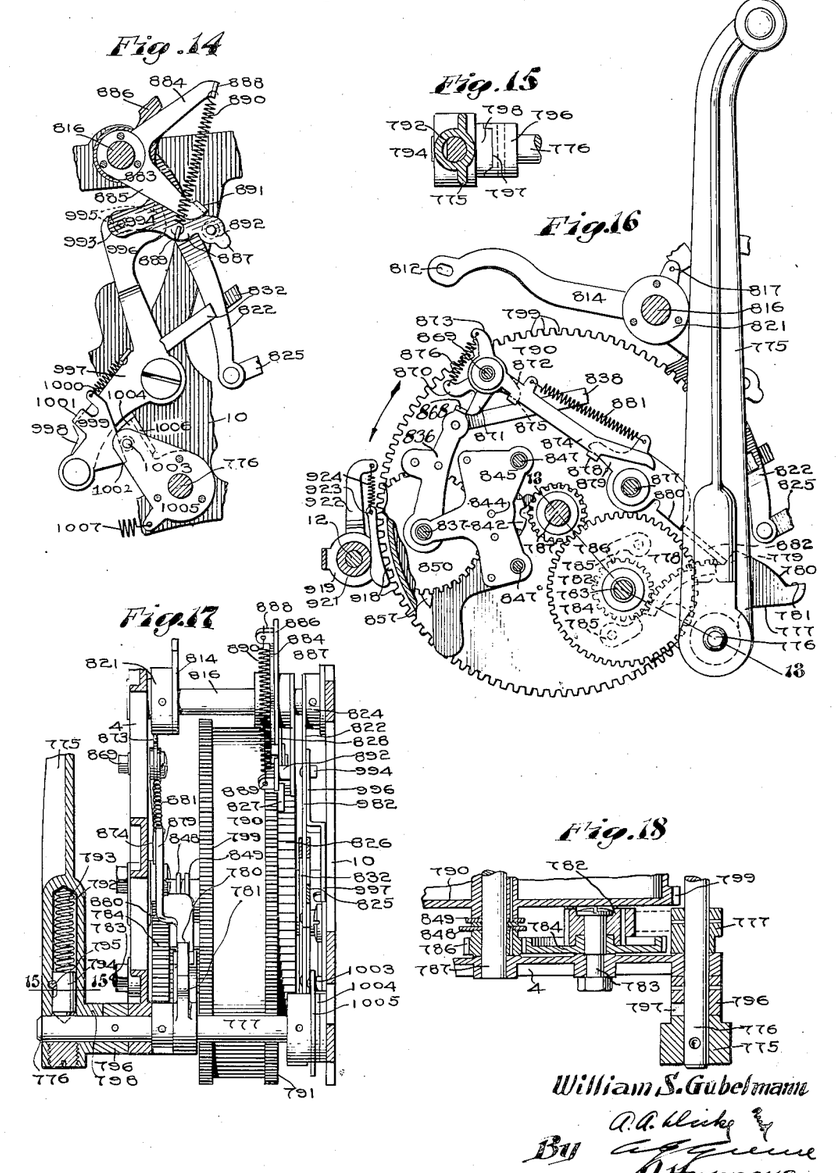
Fig. 14 is a detail side elevation illustrating the mechanism for effecting operation of the machine when the operating lever is swung.
Fig. 15 is a sectional view of the main operating lever, taken on the line 15—15 of Fig. 17.
Fig. 16 is a fragmentary right side elevation of the power storing mechanism.
Fig. 17 is a rear elevation of the mechanism shown in Fig. 16, the operating lever and main frames being shown in section.
Fig. 18 is a fragmentary sectional view taken on the line 18—18 of Fig. 16.

The mechanism comprising this hand-operated driving device is constructed as follows:

The machine is provided with an operating key 741 (Figs. 1, 2, 4, 7 and 19) and an operating lever 775 (Figs. 16 and 18). In ordinary operations of the machine the operation of the key furnishes sufficient power; but in doing heavy work the operating lever should be used from time to time to store up a surplus amount of power, said operating lever being particularly constructed for this purpose.

The operating lever 775 is removably secured on the outer end of a transverse shaft 776 which may be termed the operating lever shaft and which is mounted in the frames 4 and 10 (see Figs. 1, 9, 10 and 18). The shaft 776 has attached to it a segmental body 777 (Figs. 2 and 16) comprising a portion carrying gear teeth 778, a stop shoulder 779, a guide portion 780, and a second stop shoulder 781. The gear teeth 778 of this segmental body mesh with the teeth of a small gear wheel 782 mounted loosely on a stud 783 secured to the frame 4; between this small gear wheel 782 and the frame 4 and loosely mounted on the same stud 783 is a large gear wheel 784 carrying two pawls 785 mounted on its side adjacent to small gear wheel 782. These pawls engage the teeth of the small gear 782 so that the latter in turning in one direction must carry the large gear wheel with it, but in turning in the opposite direction is free to move independently thereof. The large gear wheel meshes with a small one 786 carried by the motor spring shaft 787 mounted in bearings in the frames 4 and 10. This second small gear is secured to its shaft 787 by a pin or any desired means. To the spring shaft 787 near its center is secured a collar 788 (Figs. 9 and 10) and to this collar is fastened the inner end of the main power or motor spring 789. The outer end of the motor spring is attached to the right-hand portion 790 of a spring box for containing the motor spring. The spring box or casing is composed of right-hand and left-hand portions 790 and 791, respectively, of which the right-hand portion forms the side adjacent to the frame 4 and also the enclosing rim, and the left-hand portion forms the side adjacent to frame 10 or the cover of the spring box. Both portions are loosely mounted on the spring shaft 787.

The operation of winding the motor spring by means of the operating lever is as follows:

The operating lever is drawn forward by the hand of the operator, thereby rotating shaft 776 which swings segment 777 forward. The teeth 778 of segment 777 cause the small gear 782 to rotate; and in so doing the latter by means of pawls 785 carries with it larger gear 784 which in turn rotates the small gear 786 and the spring shaft 787. The collar 788 being fast to the spring shaft turns with it, thereby winding the motor spring.

The relative sizes and arrangement of the gears is such as to cause the motor spring to be wound considerably more than is necessary to perform a single operation of the machine at each stroke of the operating lever, so that a few operations of this lever will wind the spring entirely, after which the operating key should be used.

Figure 2:
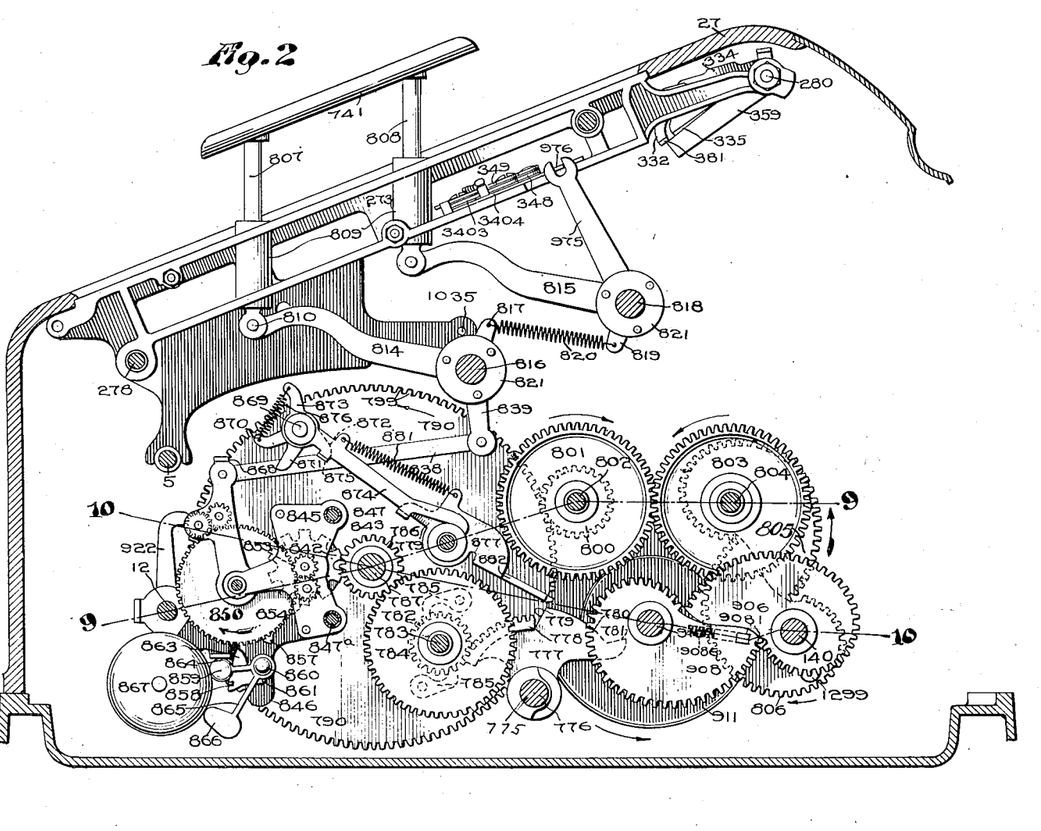
Fig. 2 is a vertical, longitudinal or front-to-rear section immediately inward from the right-hand main frame of the machine, showing the driving mechanism with the parts of the controlling mechanism therefor which are secured to said main frame 4.

The hub of the body 777 is cut away, as shown in Figs. 2 and 18, at the rear end and near the frame 4 to allow free movement of the scroll gear 908, which gear will be fully described hereinafter.

*The operating lever attachment*

Figure 1:
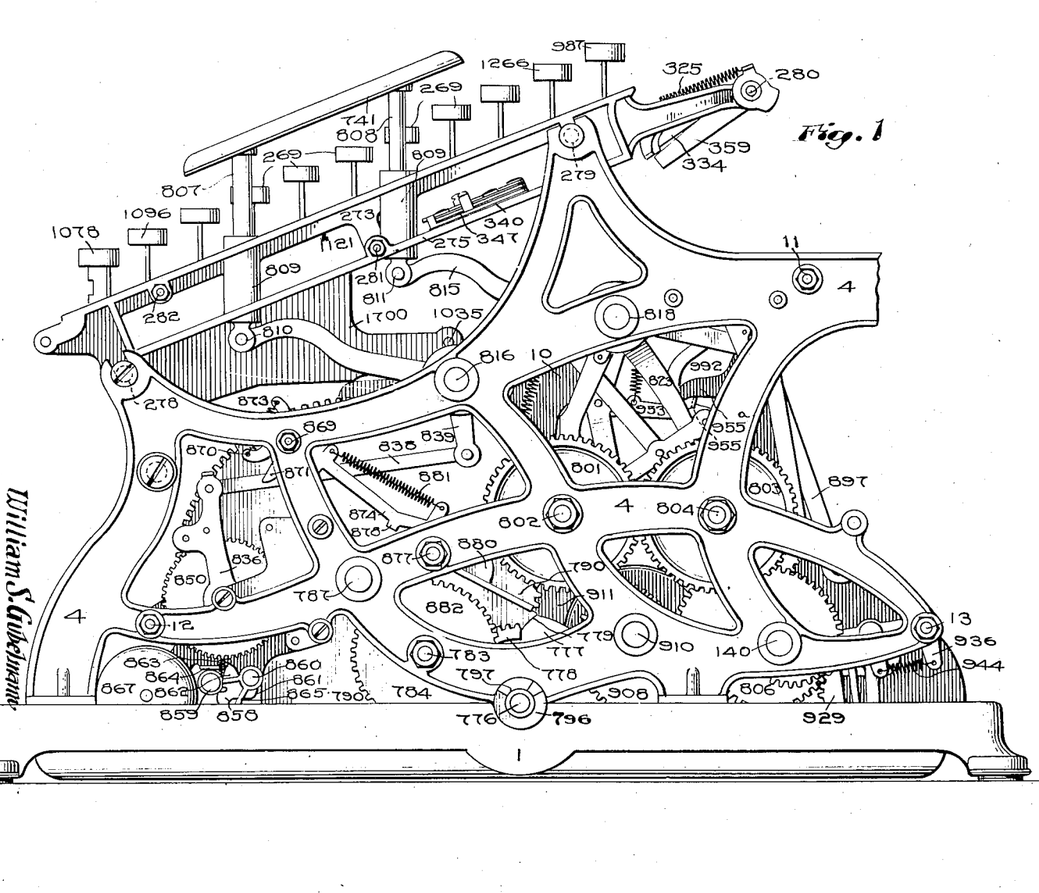
Fig. 1 is a fragmentary right side elevation of the machine with the cover removed.

The operating lever is removably attached to its shaft 776, as shown in Figs. 1, 15 and 17, as follows:

The operating lever has a socket 792 running from the shaft 776 up into said lever. In this socket is placed a spring 793 which is compressed within the socket by a plunger or detent 794, said plunger being substantially conical on its lower end but slightly rounded at the apex. The plunger 794 has a notch in its side, and a pin 795 passing through the lever also passes through this notch so that the plunger is retained in the lever, though allowed a limited amount of longitudinal movement therein. The shaft 776 has a circular depression in it and a beveled outer end. The depression cooperates with the conical end of the plunger 794 so that when the handle is in position it will not be easily displaced sidewise, the beveled end making it easy to push the hub of lever 775 over the shaft 776 by forcing plunger 794 up. Secured to the shaft 776 is a collar 796 having a depression in its outer end. The inner side of the hub of the operating lever has a projection or tooth 798 which just fits the depression in the collar. When the hub of the lever is pressed over the shaft with the tooth 798 registering with the depression 797 until the plunger 794 snaps into the depression in shaft 776, the lever is firmly attached to the shaft and each operation of the lever moves the shaft through tooth 798 and collar 796.

A smart lateral pull on lever 775 serves to disengage it from the shaft as plunger 794 is thereby forced up against the power of spring 793 out of the depression in the shaft 776.

As shown in Fig. 15, the depression 797 and tooth 798 have cooperating abrupt shoulders and cooperating inclined shoulders. These parts are so constructed in order that in pulling forward on the operating lever the pressure is on the abrupt shoulders. In returning, the lever is moved very quickly by spring 1007 and gathers considerable momentum; as the shaft is stopped, the momentum of the handle places a strain against the inclined faces and moves slightly around and out on the shaft. When the momentum is expended, the lever is returned to its normal position by means of the plunger. The lever returning spring 1007 is made and fitted to, as nearly as possible, just meet the needs of the operating lever return.

*Power transmitting device*

Figure 9:
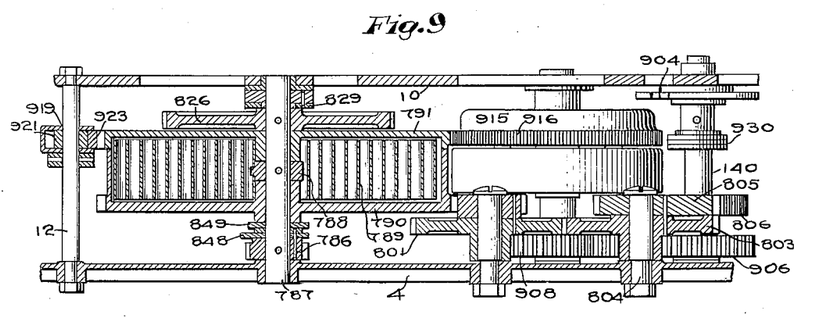
Fig. 9 is a detail sectional view of the power storing, transmitting and returning device, taken on the line 9—9 of Fig. 2, with parts omitted.
Figure 10:
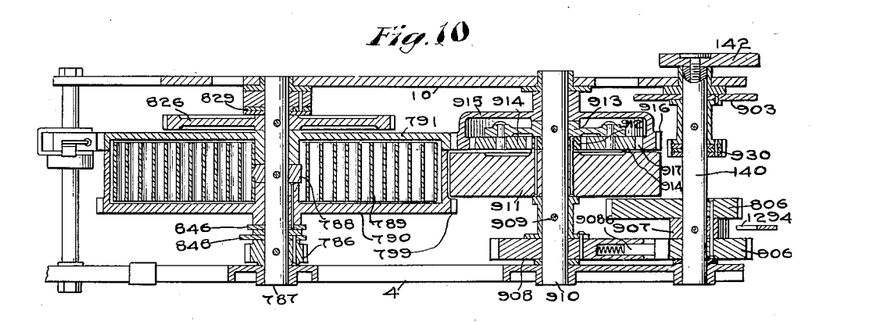
Fig. 10 is a view similar to Fig. 9, but taken along the line 10—10 of Fig. 2.
Figure 11:
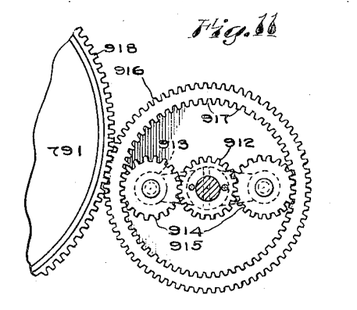
Fig. 11 is a detail side elevation of the compensating gearing of the power or driving mechanism and a fragment of the left-hand side of the main driving spring box.

Means are provided for transmitting power from the motor spring to the main operating shaft, as best shown in Figs. 2, 9 and 10.

As previously mentioned, the outer end of the motor spring 789 is secured to the right-hand portion 790 of the spring box. This portion of the spring box is provided with gear teeth 799 about its edge, thus forming a gear wheel meshing with a gear wheel 800 secured to the side of a larger gear wheel 801, both of said gear wheels being mounted on a stud 802 secured to the side frame 4. The larger gear wheel 801 meshes with a gear wheel 803 mounted on a stud 804 also secured on the side frame 4. The gear wheel 803 is secured to the side of a scroll gear 805 mounted on the same stud 804, said scroll gear meshing with a second scroll gear 806 mounted on and secured to the main operating shaft 140. The motor spring 789 constantly tends to drive the spring box portion 790 and through the train of gearing just described exerts a constant variable tension on the main operating shaft so long as there is any power stored in the spring. The purpose of the scroll gearing is to obtain a great leverage in order to maximize the ratio of the power exerted on the main operating shaft 140 at the beginning of its revolution for simultaneously overcoming the inertia of the shaft and connected parts, and to gradually decrease the ratio of power used and increase the rate of movement of the operating shaft and connected parts as the machine gains momentum.

*The operating key*

Figure 8:
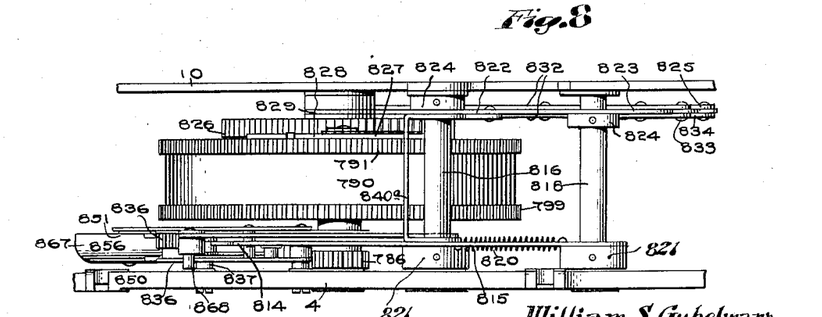
Fig. 8 is a top plan view of the power storing mechanism.

Situated at the right-hand side of the keyboard and extending above the same is a large key 741 (Figs. 1, 2, 4, 7 and 19) which has functions similar to those of the operating lever and may be termed the "operating key". This key comprises two stems or shanks, one 807 toward the front of the machine and the other 808 toward the back, which pass through two guideways 809 secured in the keyboard frame. At their lower ends, the stems 807 and 808 carry lateral pins 810 and 811, respectively, which work in slots 812 and 813 (Figs. 16, 19 and 20) in front and rear rock arms 814 and 815. The front rock arm 814 is mounted on a shaft 816 and has an upwardly projecting ear 817 (Fig. 7) and the rear rock arm is mounted on a shaft 818 and has a downwardly projecting ear 819. A spring 820 connects the ears 817 and 819 and tends to hold the operating key in its elevated position. Hubs 821 (Figs. 4 and 8) are provided for arms 814 and 815, said hubs being secured to said arms and also to their respective shafts 816 and 818, so that said shafts are turned by the depression of the operating key.

The operating key winds motor spring

Means are provided for storing power in the driving spring by means of the operating key.

822 and 823 (Figs. 7 and 8) represent front and rear depending rock arms provided with hubs 824 to which they are secured, the hub of arm 822 being also secured on shaft 816 and the hub of arm 823 on the shaft 818, so that arms 822 and 823 turn with shafts 816 and 818. 825 is a link connecting the lower ends of arms 822 and 823. 826 represents a ratchet wheel mounted on and secured to the spring shaft 787. 827 (Fig. 7) represents a pawl pivoted on the side of the left-hand portion 791 of the spring box, and engaging said ratchet wheel 826 to prevent retrograde movement of said ratchet wheel. 828 is a spring, holding pawl 827 in engagement with ratchet wheel 826.

829 (Figs. 3 and 9) represents a pawl arm, mounted loosely on shaft 787 adjacent to ratchet wheel 826 and extending downwardly from its pivot. 830 is a pawl pivoted to the lower end of arm 829 and engaging the teeth of the ratchet wheel 826; and 831 is a spring, one end of which it attached to the pawl 830 and the other end of which is attached to a projection on the forward edge of the pawl arm 829, whereby the pawl 830 is held in engagement with ratchet wheel 826. The pawls 827 and 830 lie in different vertical longitudinal planes, for the purpose of allowing pawl 827 to pass pawl 830. 832 is a pair of links which are pivoted at their forward ends to arm 829, one being placed on either side thereof. These links project rearwardly, one passing on each side of arms 822 and 823, and are connected to each other at their rear ends by a pin 833. This pin carries a roller 834 and spaces the links apart, the roller riding on the rear edge of arm 823.

When the operating key is depressed, the shafts 816 and 818 are rocked, which movement rocks arms 822 and 823, the latter engages roller 833 forcing it rearwardly and with it links 832 which pull pawl arm 829 rearwardly. The pawl 830 moves with arm 829 turning ratchet wheel 826 whereby the shaft 787 is turned and the motor spring wound.

A spring 835 (Fig. 3) tends constantly to draw arm 829 to its forward position.

The power regulator connections

Means are provided whereby the operating key winds the motor spring a greater or less amount at each depression, according to the amount the spring is already wound or unwound.

The mechanism by which this regulating of the winding is accomplished is constructed as follows:

836 (Fig. 7) represents a pair of power regulating arms loosely pivoted on a stud 837 secured in the frame 4 of the machine. These arms, as will be immediately hereafter fully described, are connected with the motor winding and unwinding mechanism so that as the motor is wound their upper ends are moved rearward and as the motor unwinds their upper ends are moved forward. The upper ends of arms 836 are connected to a link 838 which extends rearwardly and at its rear end pivotally connects with a depending arm 839 of a rock lever loosely mounted on shaft 816. The upper arm 840 of this rock lever (which is connected to arm 839 by yoke 840ᵃ) connects by means of a link 841, with the links 832 just in front of the arm 823.

As the motor is wound the arms 836 are moved rearward pushing the link 838 rearward, thereby rocking arms 839 and 840 so that the latter pulls link 841 upward which raises links 832. The roller 834 is thus brought up on the arm 823 to a point nearer the pivot 818 of the latter and, when the operating key is now depressed, the arm 823 will impart less of a throw to the links 832 and the ratchet wheel 826 will be turned a less amount. As the motor unwinds, the arms 836 move forward and, through the parts just described, swing links 832 down so that a greater throw is imparted thereto by arm 823 at each depression of the operating key and the spring is wound a greater amount.

Power regulator

Figures 6, 7:
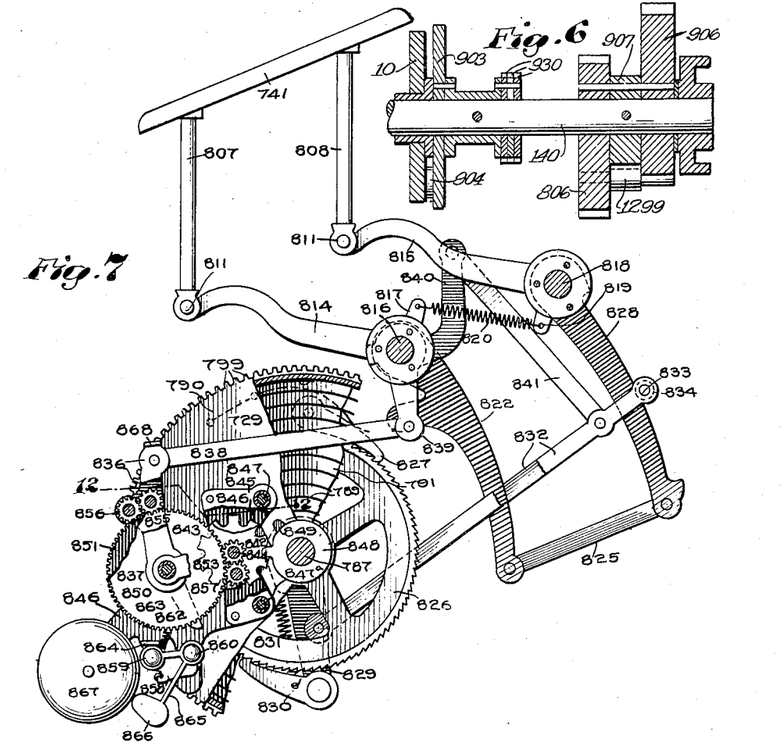
Fig. 6 is a fragmentary vertical sectional detail view illustrating the main driving or operating shaft and its adjuncts.
Fig. 7 is a fragmentary side elevation showing the power storing mechanism, operating key and connections.
Figure 12:
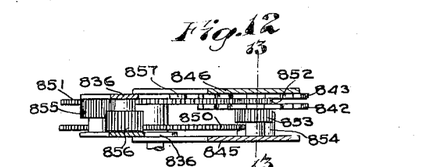
Fig. 12 is a sectional enlarged plan view taken on the line 12—12 of Fig. 7, showing the power regulator governing mechanism.
Figure 13:
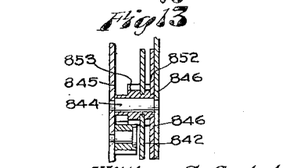
Fig. 13 is a fragmentary sectional view taken on the line 13—13 of Fig. 12.

Means are provided whereby the extent of winding of the main power spring at each operation is controlled according to its condition. The mechanism for this purpose, as shown in Figs. 7, 12 and 13, is constructed as follows:

842 and 843 represent two intermittent gear wheels which are pivoted loosely on the same arbor 844. This arbor is mounted in side plates 845 and 846, which plates are supported by studs 837, 847 and 847ᵃ (Fig. 2) secured to the frame 4. The gear 842 meshes with a single tooth pinion 848 mounted on and secured to the spring motor shaft 787, while gear 843 meshes with a single tooth pinion 849 which is secured to the transmitting or right-hand portion 790 of the spring box (see Figs. 7 and 9). 850 and 851 represent two master gear wheels which are loosely mounted side-by-side on the regulator stud 837 (Figs. 7 and 12). 852 (Figs. 12 and 13) represents an intermediate gear pinion meshing with the master gear wheel 851 and secured to the intermittent gear wheel 843. 853 and 854 represent two intermeshing intermediate pinions, 853 being secured to the intermittent gear wheel 842, while 854 is mounted on a pin on plate 845 and meshes with both pinion 853 and master gear 850. 855 and 856 represent two intermeshing planetary compensating gear pinions which are pivoted on pins between the regulator arms 836, pinion 855 meshing with gear 850 and pinion 856 with gear 851.

As the winding shaft 787 of the motor spring is turned for winding up the spring, the single tooth pinion 848 thereon turns the intermittent gear wheel 842 and its intermediate gear wheels 853 and 854 turn the master gear wheel 850 in the direction of the arrow (Fig. 2). Master wheel 850 turns pinion 855 which turns pinion 856 which rolls about its master wheel 851 (assuming wheel 851 to be stationary at this time) and as pinion 856 is mounted on arms 836 said last mentioned arms are moved rearwardly.

As the motor spring unwinds, it turns the portion 790 of the spring box which actuates in turn the members 849, 843, 852, 851, 856 and 855, and thereby forces arms 836 forward.

If the motor spring is being wound up at the same rate as it is unwinding these two movements neutralize each other.

Should the winding and unwinding occur at the same time but at unequal rates the two trains of gearing will adjust themselves so that the arms 836 will be moved in accordance with the difference between the winding and unwinding movements.

The regulating arms reach the end of their movement in the direction towards the rear when the motor spring is fully wound, and they reach the limit of their movement in the forward direction when the spring has been unwound as much as permissible.

Means are also provided for audibly indicating when the spring is completely wound.

857 (Figs. 2 and 7) represents a trip finger carried by one of the regulator arms 836 which finger extends downwardly below the wheel 851. 858 is a trip dog which is pivoted to the front arm 859 of a rock lever pivoted at 860 to the plate 846. The trip dog 858 has a rear shoulder 861 which engages under the pivot pin 860 of arm 859 and an upper tripping cam 862 which is in a position to be engaged by finger 857. A spring 863 from a finger on the dog 858 to plate 846 and located between the cam 862 and its pivot on arm 859 tends constantly to draw the dog 858 and arm 859 into its elevated position. A stop 864 limits the upward movement of arm 859. The rock lever, of which arm 859 is one arm, has a downwardly extending flexible hammer arm 865 ending in a hammer head 866. 867 represents a bell mounted on plate 846 and adapted to be struck by the hammer 866.

As the motor spring is winding, the finger 857 moves in a direction towards the front of the machine, approaching the tripping cam 862 of the bell hammer 866. When the spring is nearly completely wound, the finger 857 contacts with the cam 862 depressing the latter and the arm 859, thereby retracting the bell hammer 866. Further winding of the spring causes the finger 857 to pass beyond the cam 862, releasing the latter and permitting the spring 863 to move the bell hammer to strike the bell, thereby indicating to the operator that the spring is sufficiently wound.

When the spring is thereafter unwound, the finger 857 moves toward the rear of the machine passing by and tripping the cam 862, turning the latter on its pivot without moving the hammer arm 859.

*Operating lever lock*

Means are provided for blocking the operating lever against movement when the motor spring is fully wound. The mechanism for this purpose, as shown in Figs. 1, 2 and 16, is constructed as follows:

868 represents a finger on one of the regulator arms 836. 869 is a stud secured in the frame 4 on which are mounted two rock levers one of which comprises the front, lower and rear arms 870, 871 and 872, respectively, and the other of which comprises front and rear arms 873 and 874, respectively. 875 is a bent-over finger on the under edge of arm 874, and 876 is a spring connecting arms 873 and 870 which holds the arm 872 against finger 875. The rear end of arm 874 rests on a washer mounted on a stud 877 secured in the side frame 4. 878 represents a bent-over finger on the under edge of arm 874 near its rear end. Mounted on the stud 877 is a rock lever comprising front and rear arms 879 and 880, respectively. 881 is a spring connecting upper ears on arms 874 and 879, which spring tends to hold the lower edge of arm 879 against finger 878. 882 represents a bent-over finger on the end of arm 880, said finger projecting rearwardly from the end of said arm and normally forming a stop for the operating lever in its forward movement by contacting with shoulder 781 of the segment 777. As the motor spring is being wound up the arms 836 are moved rearwardly, as previously described, and when the spring is fully wound the finger 868 contacts with the lower rock arm 871 pushing it rearwardly, whereby arm 872 is raised and arm 870 lowered. The spring 876 then pulls down on arm 873 moving arm 874 up, retaining finger 875 in contact with arm 872. Arm 874 raises finger 878 which lifts arm 879 thereby rocking arm 880 until the finger 882 stands in front of stop 779 which blocks the forward movement of the operating lever. Should the spring become fully wound during a stroke of the operating lever, the finger 882 would simply press on cam 780 causing arms 874 and 873 to remain in their normal position and spring 876 to be strained during the remainder of the forward and the entire back stroke of the operating lever, but at the completion of the back stroke the finger 882 would be forced down in front of stop shoulder 779. As the motor unwinds and finger 868 is drawn forward, the various parts are returned to normal by the tension of spring 881.

*The releasing cam*

Figures 3, 4, 5:
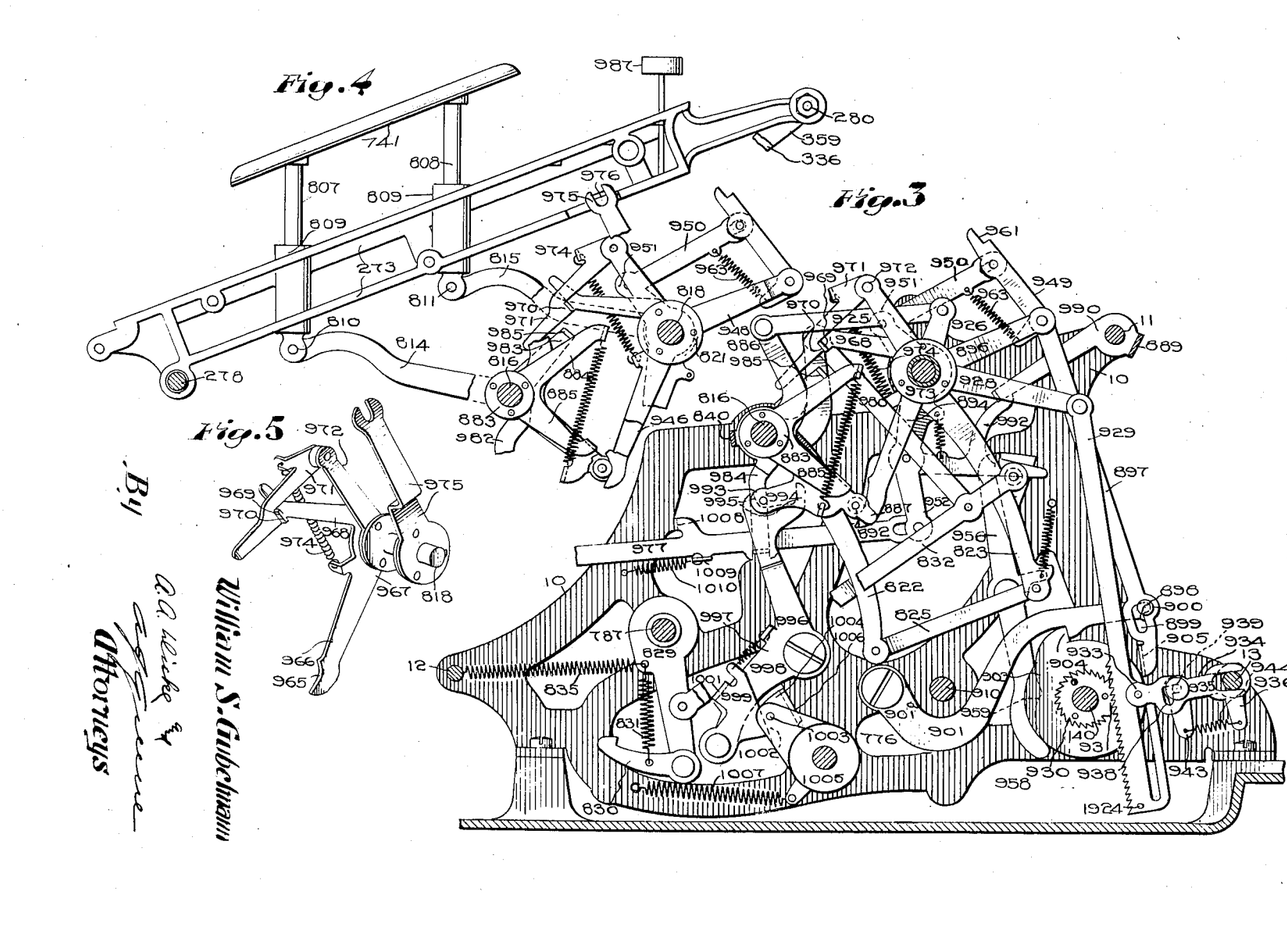
Fig. 3 is a fragmentary vertical, longitudinal section showing the parts controlled by the operating key.
Fig. 4 is a fragmentary side elevation showing the operating key and mechanism operable thereby in normal position.
Fig. 5 is a perspective view showing the mechanism whereby the operating key locks all the number and identifying shifting keys.
Figures 19, 20, 21:
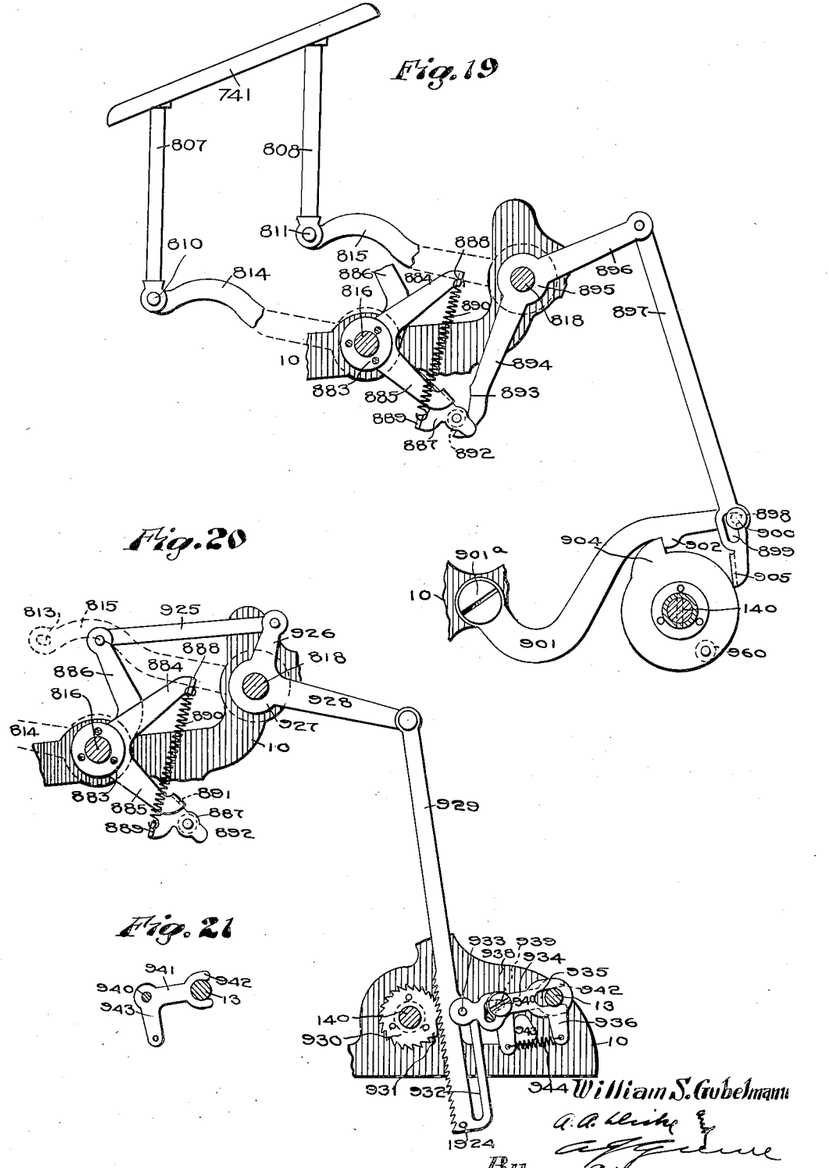
Fig. 19 is a fragmentary side elevation showing the connections whereby the operating key releases the main operating shaft.
Fig. 20 is a fragmentary side elevation showing mechanism for controlling the return of the operating key.
Fig. 21 is a detail side elevation of one member of the mechanism shown in Fig. 20.

Means are provided for releasing the operating mechanism when the operating key is depressed, as illustrated in Figs. 3, 4 and 19.

883 represents a rock lever secured on the shaft 816 of the operating key mechanism, said rock lever having upper and lower rear arms 884 and 885. 886 and 887 represent upper and lower arms, respectively, of a rock lever mounted loosely on shaft 816 adjacent to lever 883. 888 is a bent-over finger on arm 884; 889 is a similar finger on arm 887, and 890 is a spring connecting fingers 888 and 889 and tending constantly to hold arm 887 against a finger 891 projecting laterally from arm 885. The arm 887 carries a roller 892 near its end, which roller normally stands in front of a cam face 893 of a lower arm 894 of a rock lever mounted loosely on shaft 818, and having a rearwardly and upwardly projecting arm 896 which arm is connected at its rear end to a link 897 which extends downwardly in the machine. The link 897 is broadened near its lower end and a bayonet slot is formed in this broadened portion. This slot has a rearwardly extending upper portion 898, and a downwardly extending lower portion 899. 900 represents a pin extending laterally from the rear end of a curved rock arm or detent 901, which rock arm is pivoted at 901ᵃ to the frame 10, and which pin extends normally into the upper rear portion 898 of the slot in link 897. 902 represents a downwardly extending stop lug formed on the under side of the rock arm 901 near its rear end, said stop lug having a forwardly facing abrupt edge. 903 represents the releasing cam which is mounted on and secured to the main operating shaft 140 near the right-hand end of said shaft; and 904 is a stop lug or shoulder formed on the releasing cam 903 and having an abrupt face adapted to engage with the abrupt face of the stop lug 902.

When the operating key is depressed, the shaft 816 is turned thereby rocking lever 883 which, through spring 890, raises arm 887 so that roller 892 rides up the cam 893 rocking arm 894 rearwardly. As arm 894 moves rearwardly, the arm 896 is raised lifting link 897 which, through the medium of the shoulder in the slot 898 and pin 900, raises the rear end of rock arm 901 so that the stop lug 902 is drawn out of engagement with the stop lug 904 of the operating cam, allowing the operating cam 903 and shaft 140 to be rotated by the spring motor.

Means are provided for stopping the operating shaft at the end of one revolution when the operating key is held depressed.

905 (Fig. 3) represents a finger projecting from the lower front edge of the link 897 and standing in the path of the stop lug 904 of the operating cam. When the operating cam is released, during the first part of its revolution the stop lug 904 strikes the finger 905 forcing the link 897 rearwardly, whereby the pin 900 passes out of the upper portion 898 of the slot and drops down in the portion 899 accompanied by the arm 901 so that the stop 902 will engage the stop 904 when the cam 903 has completed a revolution, even though the link 897 should remain raised. After the operating key 741 is released, the link 897 is lowered and its lower end drops forward by gravity and again engages the pin 900 in the upper rearward extension 898 of its slot.

*Power returning device*

Means are provided whereby all excess power, sent out from the motor spring during an operation of the machine, is returned again to said motor spring. The mechanism for this purpose, as shown in Figs. 1, 2, 9, 10 and 11, is constructed as follows:

906 represents a scroll gear wheel mounted on the main operating shaft 140 and spaced away from the driven scroll gear 806 by a washer 907, which is pinned to the operating shaft. The washer 907 and the scroll gear 806 and 906 are secured to each other by pins so that both gears are thereby secured to the shaft 140 and turn therewith. 908 represents a scroll gear meshing with scroll gear 906 and secured to one end of a hub or sleeve 909, which hub is secured to a shaft 910 having its bearings in frames 4 and 10. Mounted loosely on the shaft 910, and directly next to the other end of sleeve 909 is a fly wheel 911 secured to the opposite side of which is a small gear wheel 912 also loose on shaft 910. Next to this small gear wheel is a differential arm 913 carrying a plurality of planetary pinions or gear wheels 914, which pinions mesh with the small gear wheel 912. This differential arm is mounted on and secured to the shaft 910. Mounted loosely on the shaft 910 next to the differential arm 913 is a cup-shaped wheel 915 the outer part of which extends laterally over the differential arm 913 and gears 914. This wheel 915 carries exterior and interior gear teeth 916 and 917 (Fig. 11) respectively, so as to form a combined internal and spur gear wheel, the interior teeth 917 meshing with the teeth of the pinions 914 and the exterior teeth meshing with gear teeth 918 arranged on the periphery of the portion 791 of the spring box.

When the main operating shaft is driven, it carries the scroll gear 906 with it, which turns scroll gear 908 and, through sleeve 909, rotates shaft 910. The movement of shaft 910 is communicated to differential arm 913 which swings the pinions 914 which tend to drive the cup-shaped wheel 915 and portion 791 of the spring box, but this movement of the spring box is prevented by detaining means which will be presently described. The cup-shaped wheel 915 being held against movement, the differential arm 913 forces the pinions 914 to roll about their inner gear teeth 917 and thereby turn the small gear 912 and fly wheel 911 at a greater rate of speed than shaft 910. The construction is such that at the beginning of an operation of the machine the spring unwinds at a rapid rate of speed in order to overcome the momentum of the parts actuated, and this rate of unwinding gradually diminishes until at the end of the operation it is nearly nil, and also at the beginning of an operation the fly wheel 911 revolves at a very low rate of speed with relation to the shaft 140 and the parts of the machine operated by said shaft and at a much lower rate of speed with relation to the main spring 789, and as the operation continues the fly wheel revolves at a continually increased rate of speed with relation to said spring gear 791 and said main shaft 140, so that at the end of the operation the main shaft drives the fly wheel at a relatively very high rate of speed, the result being that towards the end of the operation the movement of the parts operated by the main shaft 140 is gradually retarded and a considerable amount of the momentum of said parts is transmitted to the fly wheel.

At the end of the operation, when the shaft 140, scroll gears 906 and 908, shaft 910 and differential arm 913 have made a complete revolution, the shaft 140 is arrested, as has been described, which stops said parts 906, 908, 910 and differential arm 913, at which time the fly wheel, which is rotating at a high rate of speed, through the medium of the small gear 912 and gears 914, 917 and 916, turns the spring gear 791 in a direction opposite to which it is detained by said detent and, through the medium of the pawl 827, ratchet 826 and shaft 787, winds said spring until the movement of the fly wheel is arrested.

The means illustrated in Figs. 9, 10 and 16, for preventing the movement of the spring box portion 791 in one direction, is constructed as follows:

919 represents a yoke-shaped framework mounted on and secured to the tie rod 12 fast to the frames 4 and 10 of the machine, the rod 12 passing through both sides of the yoke 919, between which sides of said yoke is mounted a roller 921 which turns about rod 12 as an axle. A finger 922 is formed integrally with and projects upwardly from the yoke. 923 represents a wedge-shaped movable stop suspended by a spring 924 between the roller 921 and the portion 791 of the spring box, said stop 923 being confined laterally between the sides of the yoke 919.

When the left-hand portion 791 of the spring box moves in one direction it slips by the stop 923, but when it attempts movement in the opposite direction the stop 923 jams between roller 921 and gear teeth 918 of the spring box portion 791.

The mechanism above described therefore constitutes a friction brake which permits movement of portion 791 in one direction, but prevents such movement in the opposite direction.

The scroll gears

When the ratio of the leverage between the teeth nearest the center and those farthest from the center of each scroll gear of a pair is great, their meshing may be perfected, and friction reduced, by providing the first tooth of one of said gears with a yieldable spring-pressed tooth.

As illustrated in Figs. 2 and 10, the yieldable tooth 9081 is formed with a head 9082 and a shank 9083, the latter being formed with a shoulder 9084. A socket 9085 is provided in the face of the driven scroll gear 908, and the tooth 9081 is seated in this socket and held outward by a spring 9086. A pin 9087 prevents the spring from forcing the tooth 9081 too far outward. When the driver gear wheel 906 has completed a revolution and is stopped by the lug or shoulder 904 (as already explained) the tooth nearest the center of the driver gear wheel 906 presses the tooth 9081 inward, while the momentum of the driven gear wheel carries its tooth beyond the yieldable tooth 9081, and the latter is brought into mesh with the driver gear wheel by means of the spring 9086, so that when the driver gear wheel again starts, it pulls the driven gear wheel with it. The yieldable tooth may, if desirable, be provided in lieu of the rigid tooth nearest the center of the driver gear wheel, and any proper and desirable form and arrangement of this yieldable tooth is within the scope of this invention.

Operating key restraining mechanism

Means are provided for restraining the return of the operating key, as shown in Figs. 3 and 4.

925 represents a rearwardly extending link connecting the arm 886 with the upper arm 926 of an elbow lever mounted on shaft 818, the rear arm 928 of which lever supports a depending ratchet bar 929 having ratchet teeth on its lower front edge. 930 represents a ratchet wheel secured to the main operating shaft 140, the teeth of which engage the ratchet teeth of the bar 929.

The ratchet wheel 930 comprises three sheets of metal arranged side by side and riveted to a hub or sleeve secured on the main operating shaft 140, the releasing cam 903 being riveted to the other end of said sleeve.

When the operating key is depressed, the arm 886 is moved to draw link 925 forward, thereby swinging arm 926 forward, rocking lever 927 and causing arm 928 to lift bar 929, the ratchet teeth thereof sliding idly over the teeth of ratchet wheel 930. If the operating key be now released, the train of mechanism tends to force ratchet bar 929 down but is prevented from doing so by the teeth on bar 929 engaging the teeth on ratchet wheel 930, so that the ratchet bar descends with the revolution of wheel 930, thereby preventing noise and jar.

In case the operating key or lever is only partly depressed, but not far enough to set the operating mechanism in motion, the ratchet bar 929 is held in its partly elevated position by engagement of its teeth with the ratchet wheel 930, which does not move until the machine is set in operation. The ratchet bar connections 927, 925, and 886, are also held in their partly operated positions and by means of the connections with the operating key (previously described) hold it in its partly depressed position.

As the ratchet wheel which connects with the ratchet bar that controls the return of the operating key is fast on the operating shaft, and as this shaft is governed by the fly wheel 911, the operating key return is controlled by the fly wheel.

The spring 820 (Fig. 2) which returns the operating key, exerts, through the train of mechanism described above, a downward pressure on ratchet bar 929 when the operating key has been depressed and released. This power is transmitted through ratchet wheel 930 to the operating shaft 140 from which it helps to turn the fly wheel 911 and is turned by said fly wheel into the motor spring. Thus, the spring for returning the operating key exerts a slight winding power on the motor spring.

Means are provided for disengaging the operating-key restraining means when the operating key is held down too long, and for rendering it again operative when the key is released and allowed to assume normal position.

931 (Fig. 20) represents a high tooth on the ratchet wheel 930. The lower portion of the ratchet bar 929 is broadened and in this broadened portion is formed a slot 932 in which works a pin 933 extending laterally from the front end of a bar 934. This bar 934 has slot 935 near its rear end, by means of which slot said bar is mounted on the tie rod 13. 936 is a depending rear finger on bar 934. A bayonet slot near the middle of bar 934 has a downwardly extending front portion 938 and a rearwardly extending upper portion 939 in which latter portion normally rests a pin 940 mounted on frame 10 and extending through a bar 941 (Fig. 21) lying parallel with bar 934 and having its rear forked end 942 straddling the tie rod 13. 943 represents a lower front finger on bar 941, and 944 a spring connecting fingers 936 and 943 which tends to keep bar 934 in its forward position with pin 940 in portion 939 of the bayonet slot, and to raise the front end of bar 934.

When the operating key is depressed and held depressed, the ratchet bar 929 is held in its elevated position and the teeth on ratchet wheel 930 trip idly by the teeth on bar 929 until near the completion of the revolution of ratchet wheel 930 at which time the tooth 931 impinges upon the bar 929 forcing it back. The front edge of slot 932 contacts with a pin 933 and pushes bar 934 rearwardly until pin 940 stands over portion 938 of slot 937. The spring 944 now raises the front end of bar 934, so that the pin 940 stands in the portion 938 of the slot, thus locking bar 929 out of engagement with ratchet wheel 930 so that bar 929 is free to descend. When bar 929 descends, the upper end of slot 932 strikes pin 933 forcing bar 934 down until pin 940 stands opposite portion 939 of slot 937, spring 944 now draws bar 934 forward into its normal position. The spring 944 normally holds bar 934 forward and by so doing holds bar 929 in engagement with ratchet wheel 930.

When the operating key is held depressed too long the restraining mechanism becomes inoperative as above stated, and when the key is thereafter released its return spring brings it to normal with a considerable shock and noise. The operator will thereby be warned that he is not using the machine in the manner intended and will soon learn to operate the machine properly by releasing the key immediately after depressing it.

Operating lever connections

Means are provided whereby the operating lever may control all the functions of the machine which the operating key controls. The mechanism for this purpose, as illustrated in Figs. 3, and 14, is constructed as follows:

The forward rock arm 822 of the operating key mechanism has on its front edge a projection 993 carrying a pin 994 which pin is normally against the forward one of the two spaced shoulders 995 on the upper end of an arm 996 of an elbow lever 997 pivoted on a short stud secured in the frame 10. The lever 997 has a lower front arm 998 to the end of which is pivoted a pawl 999. A spring 1000 attached to an ear on the lever 997 and an ear on the pawl 999 tends to hold the latter with a bent-over finger 1001 thereof in contact with the upper edge of arm 998. The pawl 999 has a nose 1002 which normally projects under a roller 1003, carried between two rocking plates or crank arms 1004 and 1005 mounted on and secured to the operating lever shaft 776. The plate 1004 is adjacent to the frame 10 and has a flexible finger 1006 which projects through an opening in frame 10 and acts as a stop for limiting the return stroke of the operating lever. 1007 is a spring secured at one end to the frame 10 and at the other to a finger on crank arm 1005 and adapted to return the operating lever. The lever 997 constitutes a loose connection between the operating lever and operating key, being loosely connected at one end by the elements 1002 and 1003, and at the other end by the stud or shoulder 994 and the shoulders 995.

When the operating lever is depressed, the plates 1004 and 1005 are rocked by shaft 776, and said plates force roller 1003 against the upper edge of nose 1002, thereby swinging lever 997 about its pivot, so that the front shoulder 995 forces pin 994 rearward, thereby rocking the arm 822 and (through link 825) arm 823, which arms are attached to shafts 816 and 818, respectively, (as previously described) and thereby operates all of the mechanism which the operating key operates. When the operating lever is released, roller 1003 trips idly past nose 1002, raising the pawl 999 without effecting the lever 997.

It is obvious that the power storing, applying and control mechanisms herein described are capable of applications and uses in conjunction with many mechanisms other than that described in the parent application, and all such uses and applications are to be understood to fall within the scope of the appended claims, which are to be broadly construed.

What is claimed is:

1. In a calculating machine, the combination of an operating key, a pivotally mounted member immediately connected to said key, a pawl arm, a link immediately connecting with said member and said pawl arm, a pawl mounted on said pawl arm, a ratchet wheel operable by said pawl, a shaft on which said ratchet wheel is mounted, a motor spring carried by said shaft, and a driving gear wheel operatively connected to said spring.

2. In a calculating machine, the combination of a power storing and transmitting device comprising a motor spring, driven mechanism operatively connected to said motor spring and utilizing the power stored therein, means for releasing said driven mechanism for operation by said motor spring and simultaneously applying power to said motor spring, and means for audibly indicating when the stored power is diminished to a predetermined amount.

3. In a calculating machine, the combination of a motor spring, mechanism driven by said spring, an operating lever for storing power in said spring and simultaneously releasing said driven mechanism for operation by said spring, and means for preventing the operation of said operating lever when said spring has been wound a predetermined amount.

4. In a calculating machine, the combination of a motor spring, an operating lever for storing power in said spring, a shouldered segment connected with said lever, an arm operable by said lever; and means operable by said arm for preventing the operation of said operating lever when a predetermined amount of power has been stored in said spring, said means comprising a latch adapted to be moved by said arm into cooperative relation with said shouldered segment.

5. In a calculating machine, the combination of a motor spring, an operating lever for storing power in said spring, an arm operable by said operating lever, a lever positioned to be operated by said arm when a predetermined amount of power has been stored in said spring, and means operable by the last said lever to prevent the operation of said operating lever.

6. In a calculating machine, the combination of a motor spring, an operating lever for storing power in said spring, a stop for normally limiting the movement of said operating lever in one direction, and means for shifting said stop to prevent the operation of said operating lever.

7. In a calculating machine, the combination of a motor spring, an operating lever for storing power in said spring, a stop for normally limiting the movement of said operating lever in one direction, means for shifting said stop to prevent the operation of said operating lever, and means associated with said lever and cooperating with said stop.

8. In a calculating machine, the combination of a motor spring, an operating lever for storing power in said spring, a stop for normally limiting the movement of said operating lever in one direction, means for shifting said stop to prevent the operation of said operating lever, and means associated with said lever and cooperating with said stop, said means comprising a pivoted segment provided with shoulders at different distances from its pivot.

9. In a calculating machine, the combination of a motor spring, an operating lever for storing power in said spring; and a stop member comprising one stop for limiting the movement of said operating lever in one direction and a second stop for preventing the operation of said operating lever.

10. In a calculating machine, the combination of a motor spring, an operating lever for storing power in said spring; and a stop member comprising one stop for limiting the movement of said operating lever in one direction and a second stop for preventing the operation of said operating lever when said spring has been wound a predetermined amount.

11. In a calculating machine, the combination of a motor spring, an operating lever for storing power in said spring, a stop member comprising one stop for limiting the movement of said operating lever in one direction and a second stop for preventing the operation of said operating lever when said spring has been wound a predetermined amount, and a shiftable member adapted for cooperation with said stops.

12. In a calculating machine, the combination of a motor spring, an operating lever for storing power in said spring, a stop member comprising one stop for limiting the movement of said operating lever in one direction and a second stop for preventing the operation of said operating lever, a shiftable member adapted for cooperation with said stops, and means for shifting said shiftable member when said spring has been wound a predetermined amount.

13. In a calculating machine, the combination of a shaft, a driving spring on said shaft, a main operating shaft, transmission mechanism connecting said spring with said main operating shaft, a shaft intermediate of the first and second said shafts, a driver scroll gear wheel on said main operating shaft, and a driven scroll gear wheel on said intermediate shaft and in mesh with the first said scroll gear wheel.

14. In a calculating machine, the combination of a shaft, a driving spring on said shaft, a main operating shaft, transmission mechanism connecting said spring with said main operating shaft, a shaft intermediate of the first and second said shafts, a driver scroll gear wheel on said main operating shaft, a driven scroll gear wheel on said intermediate shaft and in mesh with the first said scroll gear wheel, and a fly wheel on said intermediate shaft rotated by said scroll gear wheels.

15. In a calculating machine, the combination of a shaft, a driving spring on said shaft, a main operating shaft, transmission mechanism connecting said spring with said main operating shaft, a shaft intermediate of the first and second said shafts, a driver scroll gear on said main operating shaft, a driven scroll gear on said intermediate shaft and in mesh with the first said scroll gear, a fly wheel rotated by said scroll gears, and connections from said fly wheel to said driving spring.

16. In a calculating machine, the combination of a shaft, a driving spring on said shaft, a main operating shaft, transmission mechanism connecting said spring with said main operating shaft, a shaft intermediate of the first and second said shafts, a driver scroll gear on said main operating shaft, a driven scroll gear on said intermediate shaft and in mesh with the first said scroll gear, a fly wheel on said intermediate shaft, planetary gearing for driving said fly wheel, and means for transmitting the motion of said fly wheel to said driving spring comprising said planetary gearing and an internally and externally toothed ring driven by said planetary gearing.

17. In a calculating machine, the combination of a shaft, a driving spring on said shaft, a main operating shaft, power transmitting mechanism connecting said driving spring with said main operating shaft; and means for returning power from said main operating shaft to said spring, said means comprising a spider driven by said main operating shaft, planetary pinions on said spider, a pinion engaged by said planetary pinions, a fly wheel connected with said pinions, a ring gear meshing with said planetary pinions, and external spur teeth on said ring gear engaging a gear associated with said driving spring.

18. In a calculating machine the combination of a shaft, a driving spring on said shaft, a main operating shaft, power transmitting mechanism connecting said driving spring with said main operating shaft; and means for returning power from said main operating shaft to said spring, said means comprising a spider driven by said main operating shaft, planetary pinions on said spider, a pinion engaged by said planetary pinions, a fly wheel connected with said pinions, a ring gear meshing with said planetary pinions, external spur teeth on said ring gear engaging a gear associated with said driving spring, and a detent for preventing retrograde movement of said last-mentioned gear when said spider is being driven by said main operating shaft.

19. In a calculating machine, a combined driving and power-returning device comprising a main spring, a rotary shaft to which said main spring is connected, a casing for said spring, said casing being mounted on said shaft and comprising two gear wheels, one of which is secured to said main spring and operable by the latter, a main operating shaft, transmission means connecting said main operating shaft with the spring-operated gear wheel, a rotary shaft intermediate of the first and second said shafts, transmission members connecting the second and third said shafts, a fly wheel journalled on the third said shaft, a member secured on the third said shaft and rotatable therewith, a gear wheel carried by said fly wheel, a gear wheel carried by said member, and a combined internal and spur gear meshing with the last said gear wheel and with the other of the two gear wheels of said casing.

20. In a calculating machine, the combination of an operating key, an operating shaft, a motor for driving said operating shaft, means operable by the depression of said operating key for permitting said motor to drive said operating shaft, means for returning said operating key to its normal position, and means for transmitting part of the power of the returning means to said motor.

21. In a calculating machine, the combination of an operating key, a power storing motor, an operating shaft, power transmitting connections from said motor to said shaft, means actuated by said operating key for releasing said shaft for operation by said motor through said connections, mechanism whereby the depression of said operating key transmits power to said motor, an operating key restoring device tensioned by depression of said operating key, and means for transmitting the power of said restoring device through the operating shaft to said motor.

22. In a calculating machine, the combination of an operating key, a power storing motor, an operating shaft, power transmitting connections from said motor to said shaft, means actuated by said operating key for releasing said shaft for operation by said motor through said connections, mechanism whereby the depression of said operating key transmits power to said motor, an operating key restoring device tensioned by depression of said operating key, and means for transmitting the power of said restoring device through the operating shaft to said motor and restraining the return of said operating key.

23. In a calculating machine, the combination of mechanism to be operated, a power storing motor for operating said mechanism, an operating key, connections from said operating key for storing power in said motor and for releasing said mechanism for operation by said motor, an operating lever adapted to store power in said motor, and means whereby said operating lever acts through said operating key connections to control the functions performed thereby.

24. In a calculating machine, the combination of an operating key, an operating shaft, a power storing motor, means for storing power by the depression of said operating key, and means for applying the stored power for simultaneously exerting driving force on said operating shaft and returning said operating key.

WILLIAM S. GUBELMANN.